Aug. 1, 1939.  C. B. BAZZONI ET AL  2,167,630
ELECTRICAL PROSPECTING METHOD AND APPARATUS
Filed April 2, 1936  3 Sheets-Sheet 1

WITNESS:
Rob R Kitchel

INVENTORS
Charles B. Bazzoni &
Joseph Rajek
Busser & Harding
ATTORNEYS.

Aug. 1, 1939.  C. B. BAZZONI ET AL  2,167,630
ELECTRICAL PROSPECTING METHOD AND APPARATUS
Filed April 2, 1936   3 Sheets-Sheet 2

INVENTORS:
Charles B. Bazzoni
Joseph Rajek
BY
ATTORNEYS.

WITNESS:

Aug. 1, 1939.  C. B. BAZZONI ET AL  2,167,630

ELECTRICAL PROSPECTING METHOD AND APPARATUS

Filed April 2, 1936  3 Sheets-Sheet 3

INVENTORS
Charles B. Bazzoni
Joseph Razek
BY
Busser & Harding
ATTORNEYS.

WITNESS:
Robt R Mitchel

Patented Aug. 1, 1939

2,167,630

UNITED STATES PATENT OFFICE 2,167,630

ELECTRICAL PROSPECTING METHOD AND APPARATUS

Charles B. Bazzoni, Wallingford, and Joseph Razek, Llanerch, Pa., assignors to Sperry-Sun Well Surveying Company, Philadelphia, Pa., a corporation of Delaware Application April 2, 1936, Serial No. 72,246

14 Claims. (Cl. 175—182)

This invention relates to geophysical prospecting and more particularly, by so-called electrical coring, to the determination of the nature and boundaries of formations traversed by bore holes.

The various formations which make up the portion of the crust of the earth which has been penetrated by bore holes vary quite considerably in their specific resistivities and dielectric constants. In view of this, proposals have been made to determine the location and nature of subterranean formations by producing high frequency electromagnetic fields in such fashions that they will be substantially affected by the presence of the formations under investigation. If a source giving rise to a high frequency electromagnetic field is located at or adjacent to the surface of the earth, and if the field is given the necessary spatial disposition, its characteristics measured by its reaction on the source or, alternatively, by suitable detectors located at different distances from the source, will give information from which deductions may be made as to the nature and location of subterranean formations.

It was proposed in Löwy Patent No. 1,092,065, dated March 21, 1914, to determine the nature and location of subterranean formations by producing fields of this type in bore holes or mines. In the case of a mine, the method described in that patent could be carried out by having an observer operate the apparatus directly at the source of the high frequency field. In using the method in a bore hole, however, it would be necessary to supply some telemetering apparatus to carry the results produced at the location of the source to the surface in order to be observable.

The general object of the present invention is to provide a method and apparatus whereby records are made in a bore hole at a short distance from an electromagnetic field the variations of which, due to the presence of different formations in the vicinity of the source, are to be measured. More specifically, in accordance with the invention there is generated a high frequency electromagnetic field within a bore hole by means of an exploring unit which may be lowered into the hole by means of a wire line or drill stem. The apparatus includes a suitable exciting element which may take the form of an antenna or a coil, either of which is arranged so that a substantial part of its resulting electromagnetic field penetrates the formations through which the bore hole passes. In the case of an antenna, the dielectric constants and resistivities of the surrounding earth will vary its impedance and hence its reaction upon the generating circuit of which it forms a part. The major effects in the case of an antenna will be due to the different dielectric constants of the formations which are encountered. Likewise, if a coil is used it will have an effective impedance depending primarily both upon the specific resistivities and dielectric constants of the formations lying within the portion of its field adjacent the coil. The varying impedance thus resulting as the apparatus traverses the bore hole will show itself in the generating circuit.

Specifically, in accordance with the present invention there is provided a generating circuit having the characteristic of operating at a fixed or substantially fixed frequency despite substantial variations in the impedance of an exploring coil or antenna which establishes an electromagnetic field in the strata surrounding the hole. When a circuit of this sort is used, for example, when crystal control is utilized to maintain the frequency substantially constant, the variation of impedance of the exploratory device produces substantial variations in the currents and voltages existing in the generating circuit. Specifically when crystal-control is used, adjustment may be made so that an extremely slight change in impedance of the exploratory elements will result in a quite considerable change in the currents and voltages existing in the generator, for example, in the crystal current.

The very considerable sensitivity to minor changes in impedance are normally accompanied by either cessation of oscillations on the one hand, or operation within a more stable and quite insensitive region on the other. In order to maintain the sensitivity for very considerable changes in the electrical characteristics of the strata which are encountered, provision is made for automatically adjusting the generating circuit to secure substantially constant impedance conditions in the circuit involving the exploratory element. Specifically, this is accomplished by providing a tuning element such as a condenser in the exploratory circuit, which condenser is arranged to be driven by a reversible motor controlled by changes in the generating circuit. If, for example, the motor is controlled by the crystal current, the arrangement may be so made as to maintain the crystal current substantially constant so that operation is maintained in a given region of a crystal current-impedance characteristic where the sensitivity is greatest. Obviously, in such case indications of the nature of the strata are obtained by observing the variations with depth of the stable position of the tuning element.

It is obvious that this characteristic of operation involving the maintenance of a substantially constant condition may be used with other than crystal control. This will become clear hereafter. While preferably records are made in the bore in order to avoid the necessity for providing insulated cables running to the surface so that the apparatus may not only be lowered on an ordinary wire line, but also, if desired, on a drill stem through which it is quite difficult to conduct current unless elaborate special drill stem sections are used, it is also possible to telemeter to the surface the positions of a tuning element such as that mentioned. Such telemetering also forms one phase of the invention, the telemetering, under some conditions, being useful even in an apparatus which makes the records within the bore hole, since it may be inconvenient to arrange the apparatus in some instances so that direct recording of the position of a tuned element is possible.

Even if automatic adjustment is not used to maintain some operating condition constant, a crystal circuit, or some other critically resonant circuit, is very well adapted to give quite sensitive responses if adjustments to increase stability are made. In such cases photographic recording is quite easily accomplished in accordance with a further modification of the invention, this type of recording being of even more general application. The photographic record, after development, may take the form of a track, or plurality of tracks, of variable density which may be scanned by a photoelectric apparatus to give a second record on a paper strip or the like. One advantage of this is the comparative simplicity of the apparatus in the bore hole; another is the possibility of providing a record many times the length of the film. The latter advantage is a very substantial one since the restricted space available limits the amount of film which may be carried in the instrument.

The various objects of the invention, including not only the broad ones indicated above but more specific ones directed primarily to details of construction will be apparent from the following description read in conjunction with the accompanying drawings, in which.

Figures 1A, 1B, 2, 3:
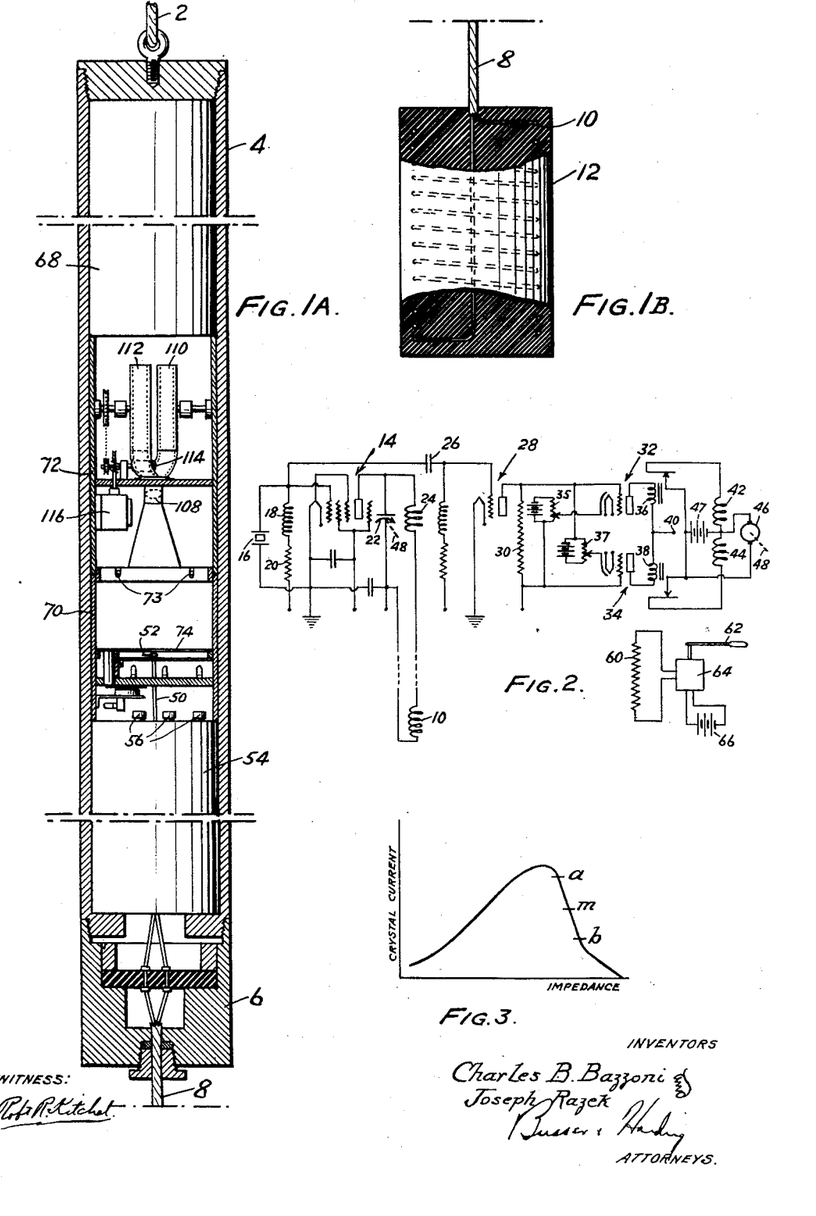
Fig. 1A is a vertical section showing in a diagrammatic form a protective casing and various elements located therein providing a preferred form of apparatus in accordance with the invention.
Fig. 1B is a continuation of the lower portion of Fig. 1A showing an exploring element.
Fig. 2 is a wiring diagram showing electrical connections involved in a preferred form of the apparatus.
Fig. 3 is a diagram showing a typical crystal current-impedance characteristic of an apparatus of the type shown in Fig. 2.

Referring first to Figs. 1A and 1B, there is shown as supported by a cable 2 an exploring unit including a protective casing 4 capable of withstanding the pressures which would be encountered in the deepest mud-filled bore hole in which the apparatus is to be used. The bottom of this casing is closed by a plug 6 which is packed in such fashion as to permit the passage of an armored two-wire cable 8 the lower end of which is connected to an insulating support 12 within which there is molded a coil 10 the ends of which are connected to the two wires extending through the cable. The support may take the form indicated or may otherwise carry an exploring coil which is of the largest diameter which may be conveniently used in the bore hole so that a considerable proportion of the lines of force of its field penetrate the formations. Its axial length should be small in order to increase the possibility of detecting very shallow formations. The spacing of the coil 10 from the casing 4 need not be very great but should be such that the metallic casing does not provide a secondary having any appreciable effect.

Referring now to the generating circuit indicated in Fig. 2, there is provided a crystal-controlled oscillator including a pentode tube indicated at 14 in the control grid circuit of which there is inserted a crystal 16. This oscillator is of conventional type, a proper bias being applied to the control grid through the choke 18 and resistance 20. The plate circuit is tuned by the condenser 22 and the exploratory coil 10, with which there may or may not be associated a further coil 24 located within the casing 4. A crystal controlled oscillator of this type will produce oscillations so long as the circuit is approximately at resonance at the fundamental frequency of the crystal. In the vicinity of the resonance condition the crystal current will vary with the impedance of the tuned circuit in a fashion such as indicated in Fig. 3. When the resonance condition exists, the crystal current will be a maximum. On one side of this, as indicated at the right hand portion of the graph in Fig. 3, the crystal current sharply drops with a change in impedance to a point where cessation of oscillations occurs. If operation is effected between $a$ and $b$ in Fig. 3, it will be seen that a very slight change in impedance will result in a very considerable change in the crystal current. Desirably, therefore, operating conditions should be such that the normal condition of operation is somewhere between $a$ and $b$ at, say, $m$.

The setup is preferably such that the impedance of the turned circuit changes very considerably more than the change from $a$ to $b$ as different formations are encountered within the well. Operation in the desired part of the characteristic must be maintained, therefore, by automatic tuning of the oscillatory circuit. This may be readily effected by the control arrangements illustrated in Fig. 2.

The control grid of the oscillator is connected through a condenser 26 to the grid of a detector tube 28, the plate of which is provided with a resistance load indicated at 30. Conditions of operation are so chosen that a maximum change in current through the resistance 30 is secured for a given variation in the crystal current. Connected across this resistance 30 as illustrated in the diagram are tubes 32 and 34, the cathodes of which are brought to proper potentials relative to the grids by potentiometers 35 and 37, cross-connected as indicated. There are symmetrically connected in the plate circuits relays 36 and 38 which are joined at their connection to the high voltage supply at 40. It will be clear that the relays may be so adjusted that they are selectively closed depending upon the magnitude of the current through the resistance 30, one or the other alone being closed whenever the current varies by some predetermined amount above or below a mean value. The two relays are connected to the outer ends of two portions 42 and 44 of a center tapped shunt field coil of a D. C. motor 46 which is energized by a battery 47. If both the relays are closed or both open under a normal condition, the field coil will be deenergized either due to no current flow or symmetrical currents in its two halves. Accordingly no torque will be produced by the motor 46. On the other hand, if either one of the relays is closed, the motor will operate in a corresponding direction. The motor is connected through suitable reduction gearing to the condenser 22 so as to drive it slowly forwardly or backwardly. These connections are diagrammatically indicated at 48.

It will be obvious from the above that by proper adjustments of the various portions of the circuit the impedance of the parallel circuit in the oscillator will be so maintained as to keep the crystal current substantially constant, deviation from the mean point $m$ of the characteristic being automatically corrected by adjustment of the condenser 22. It is found that a circuit operating as above is very sensitive and that no difficulty is experienced in maintaining operation at all times on the desired portion of the characteristic.

It is obvious that if the parallel impedance is so maintained as to keep the crystal current substantially constant the change in impedance of the coil 10 due to different formations which are encountered may be measured by the changes in the position of the condenser 22 in order to maintain the crystal current constant. In accordance with the preferred form of the invention, the position of the tuning condenser is recorded. This may be accomplished by extending the shaft of the tuning condenser indicated at 50 exteriorly of the oscillator assembly and providing it with a pointer such as 52, the position of which may be photographed.

The oscillator and other electrical apparatus may be enclosed in a unit such as indicated at 54, exterior adjustments being accomplished through knobs 56. The oscillator itself may be heat insulated if great accuracy is required. The crystal may so cut as to show practically no change in fundamental frequency with large changes of temperature. However, the temperature changes encountered in a bore hole may be such that the various impedances in the plate circuit may change considerably. Consequently, it is desirable to enclose the oscillator in a heat insulated casing containing a heating coil 60 connected through a relay 64 to a source of heating current 66 such as a storage battery, the relay being under control of a thermostat element 62 which is located within the insulating casing. The thermostat must, of course, be set so as to hold the oscillator at a temperature substantially higher than the highest which may be expected to be encountered in the bore hole. The heat insulation should not be perfect but should be such that outward flow of heat may take place to such extent that the heat generated in the oscillator circuit will not raise the temperature to that which is thermostatically set so long as there is a substantial gradient between the thermostatically controlled temperature and that of the bore hole. Indicating means may be provided to show when the temperature in the bore hole rises substantially to that maintained by the thermostat in order to give an indication that the impedance within the insulated casing may have varied. Besides the impedances within the casing, it is desirable to so construct the coil 10 and its support that a relatively slight temperature coefficient exists for the impedance. However, if this is not done, the result will be only a gradual drift of the record which is of little importance inasmuch as sharp breaks in the record are of primary interest. Because of this latter consideration, it is feasible to eliminate thermostatic control altogether where qualitative indications are primarily desired. Thermostatic control is desirable, however, where in and out runs are made for checking purposes. Because of the fact that time is consumed in heat transfer the temperatures going in will not correspond to those going out at the same depths.

Figure 4:
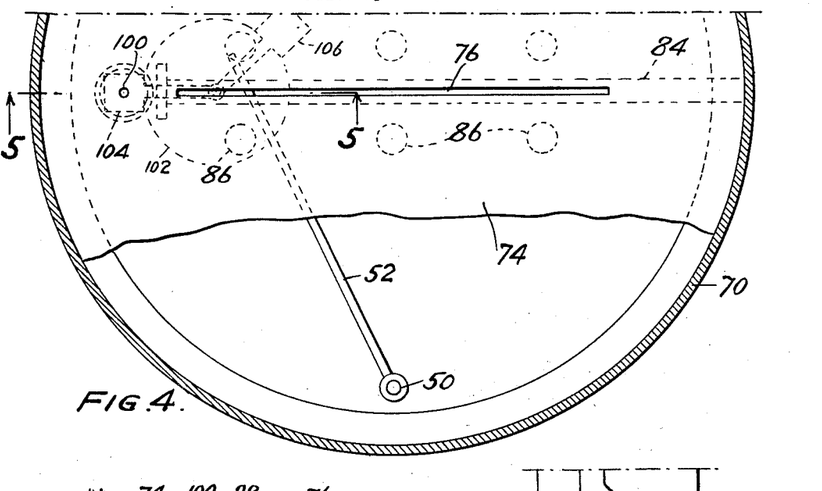
Fig. 4 is a transverse section showing the instruments which are photographed to produce the records.
Figure 5:
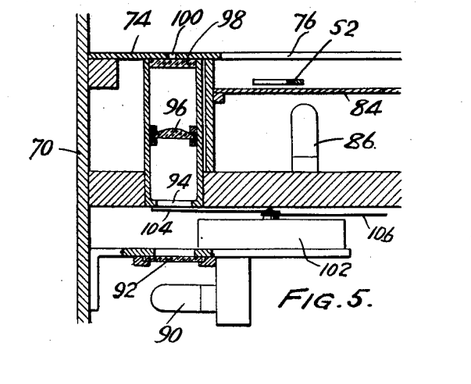
Fig. 5 is a vertical section taken on the plane indicated at 5—5 in Fig. 4.

The batteries for the operation of the device are conveniently located in a separate chamber indicated at 68 at the upper portion of the protective casing 4. Beneath this there are located two auxiliary casings 70 and 72 lined up relatively to each other, for example, by pin and slot connections indicated at 73, so that apparatus carried by the former may be located in proper position to be photographed by an automatic camera carried by the latter. The apparatus contained in the chamber 70 is shown in detail in Figs. 4 and 5. The chamber is provided with a transverse plate 74 which closes the chamber 70 except for a narrow slit 76 and a small opening 100 located as shown in the figures, the width of the slit being somewhat exaggerated therein. The pointer 52 connected to the condenser shaft 50 is located at one side of the slit so as to intercept the slit as it swings. Extending lengthwise beneath the slit 76 there is a strip 84, the upper face of which is blackened, as is also the upper face of the plate 74, to prevent reflections which might fog the film. The upper surface of the pointer 52 is whitened so as to reflect light, while the lower surface of the plate 74 is silvered or whitened so as to reflect light downwardly upon the pointer 62.

In order to give time measurements from which the depths may be ascertained, the lamp 90 is provided to illuminate ground glass target 92 located beneath an opening 94 which permits light to pass from the target 82 to a lens 96 which concentrates it upon a ground glass 98 located beneath a small hole 100. The illumination passing through the opening 100 is periodically interrupted by the hands 104 and 106 of a watch 102 which have enlarged outer ends, as indicated most clearly in Fig. 4, serving to completely cover at periodic intervals the opening 94. The hands driven by the watch mechanism may, for example, be so arranged that one makes, say, one revolution in a half minute, and the other one revolution in five minutes. In such case there will be a short interruption of the light at half-minute intervals while at five minute intervals longer interruptions will occur due to the slower passage of the five-minute hand. Located in the chamber 72 is a camera mechanism comprising a lens 108 projecting an image of the slit 76 and hole 100 upon motion picture film which passes from a supply reel 110 to a receiving reel 112 across the field of the lens in a direction transverse to the slit 76. This film is continuously driven by a motor 116 through reduction gearing and a sprocket wheel 114. If the apparatus is to be lowered on a wire line, the motor 116 is arranged to run continuously so that the film advances at a slow rate of speed, which rate, however, will be sufficient when the rapidity of lowering of the apparatus is considered, to clearly distinguish formations which would be of interest.

Figure 6:
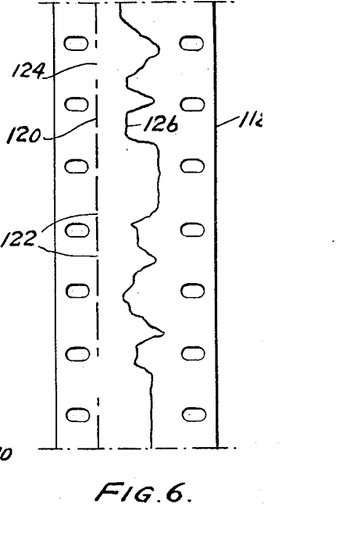
Fig. 6 is a fragmentary view showing the nature of the photographic record produced by the apparatus.

The type of record produced by the apparatus is illustrated in Fig. 6. There would be two traces on the film produced by the illuminated opening 100 and the pointer 52. These records are indicated respectively at 120 and 126. The first record as indicated above will consist of an interrupted straight line running the length of the film and provided with a series of short interruptions 122, every tenth one of which 124 will be substantially longer so as to facilitate counting in the ultimate interpretation. The record of the pointer 52 will be a wavy line 126 which will be indicative of the varying specific resistivities and dielectric constants of the encountered formations which change the impedance of the coil 10.

Numerous variations may be made while utilizing the principle of this invention. One modification which has been mentioned above involves the use of an antenna as the exploring element instead of a coil. The antenna in such case may be used to form part of the capacity in the oscillator tank circuit in various ways. The condenser formed by the antenna may be either in series or parallel with an adjustable condenser such as 22 or, instead of providing an adjustable condenser, a continuously varying inductance may be provided by arranging two coils rotatable with respect to each other by means of a controlling motor such as 46. An antenna, however, is not so satisfactory as a coil, since its length must necessarily be such as to make it impossible to detect thin formations.

If a crystal oscillator is used, changes other than those of the crystal current may be used for controlling purposes. In a circuit such as that illustrated, for example, not only does the crystal current change with change of impedance in the plate circuit but the currents and voltages in the other parts of the circuit also vary quite considerably. Advantage may be taken of any such variations for producing control of the type illustrated.

While a crystal provides the simplest arrangement for fixing some condition of the oscillator with respect to which changes may be produced by varying formations to effect substantial modifications of circuit conditions, the crystal obviously may be replaced by a resonant circuit so that the result is a tuned-plate, tuned-grid type of circuit. A somewhat similar resonance curve is produced in that case and again it is possible to vary some impedance in the circuit to maintain operations along a given portion of a characteristic such as that of Fig. 3.

Figures 7, 8:
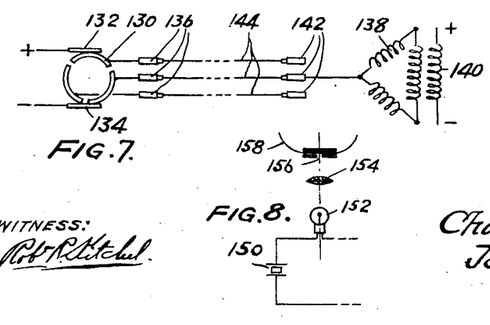
Fig. 7 is a wiring diagram showing a simple direct current operated telemetering apparatus which may be used in connection with the invention.
Fig. 8 is a diagrammatic view illustrating a modified recording arrangement in accordance with the invention.

In order to avoid surface connection, it is preferable to make records in a fashion such as that described above, the record then taking the form, for example, of a photographic picture of the movements of a pointer such as 52. In some cases, however, it may be desirable to provide a telemetering apparatus to transfer the automatic adjustments to the surface. Fig. 7 illustrates a simple device which is direct current operated and which may be used for such purpose. A three-part commutator 130, on which bear brushes 132 and 134 connected to the terminals of a battery, is mounted upon the shaft of the motor 46 which also carries slip rings 136 connected respectively to the segments of the commutator. At some remote location where the records are to be produced a motor is provided which may comprise three poles wound in delta, as indicated at 138, there being provided, say, two opposed field poles having a winding 140 which is maintained energized by a battery. The three corners of the delta connection are electrically connected to slip rings 142. Brushes bearing on the slip rings 136 and 142 are connected by three wires 144 which may run through a cable from the instrument to the surface. It will be obvious that any rotations of the motor 46 will be imparted (to an accuracy of a third of a revolution) to the armature 138 through such arrangement. This armature, through suitable reduction gearing, may drive a pointer which may be observed visually or photographed as indicated above. An arrangement of this sort may also be used where it is inconvenient to run a shaft 50 directly from a variable impedance such as condenser 22 to provide recording as in Fig. 1A. The telemetering arrangement illustrated in Fig. 7 is described in the patent to Ford, 1,153,210, dated September 14, 1915.

Inasmuch as in the preferred form of the apparatus a motor is provided to adjust an impedance, the adjustments of which are recorded, there is available for recording purposes a substantial amount of power so that instead of having recourse to photographic recording, it is possible to move a stylus transversely of a moving strip of paper or the like to produce a record. In such case time marks may be made by a suitable clockwork mechanism capable of providing marks on the edge of the paper strip.

The apparatus may be substantially simplified, with, however, a loss in sensitivity and range, by merely providing and photographing a meter, or some other instrument sensitive to current or voltage changes, located in some portion of the oscillator circuit in which substantial current or voltage changes take place as the impedance in the plate circuit varies. Alternatively the meter may be operated through a relay in the nature of a vacuum tube voltmeter responsible to voltage changes in the circuit. In any such case operation is preferably maintained along a limited portion of a characteristic such as between A and B of Fig. 3. To insure that the limits are not exceeded, the sensitivity of the exploring element must be reduced. For example, in such case an exploring coil such as 10 might provide only a relatively small portion of the inductance in a tuned circuit, the major portion being provided by an internal coil such as 24.

It is desirable, in an apparatus of this type, to have the mechanism within the bore hole as simple as possible in order to avoid substantial loss in case of an accident which might destroy or prevent the recovery of the apparatus such as, for example, the collapse of the walls of the bore hole or other causes. The type of arrangement just mentioned may be put in the quite simple form indicated in Fig. 8. In this figure, 150 represents the crystal of a crystal-controlled oscillator such as that of Fig. 2, in which, however, the coupling with the exploratory element is such that the operation is continuously along a portion such as A—B of a characteristic of the type in Fig. 3 without the necessity for automatic control. The crystal may be replaced by some other resonant circuit. A lamp 152 in the crystal circuit will then be variably illuminated, depending upon the crystal current. The light from the filament of such lamp may fall directly upon or may be concentrated as by a lens 154 upon a hole or slit 156 transversely to which there moves continuously a film such as 158. A record will then be made on the film resembling a motion picture sound track, namely, consisting, in the developed film, of lighter and darker areas which will correspond to the electrical properties of the formations which are penetrated. In view of the fact that the width of the film is of no moment, it may be quite narrow, for example, of the present commercial 8 mm. type. If a slit is used, time marks may be readily provided by causing watch hands such as 104 and 106 of Fig. 5 to periodically intercept one end of the slit.

The record thus made may not be interpretable directly. However, by providing an apparatus on the surface through which the film may be moved to intercept a light beam which is directed upon a photoelectric cell of suitable character, the responses of the cell may be made to operate recording apparatus which will result in a graph resembling that of Fig. 6. In order to record the time marks indicated above it would, of course, be necessary to provide separate portions of a single beam or a plurality of beams acting upon individual light responsive cells. The apparatus within the bore hole in this case will be comparatively inexpensive.

In the above apparatus it is desirable to provide a ballast tube in series with tube 152 in order to limit the currents thereto and thus prevent it from burning out. In addition, a photoelectric or other monitor may be provided to open circuit connections in case oscillations cease, in order to prevent damage to the oscillator circuit by the flow of excessive plate current. A consideration which must be taken into account in any appartus automatically recording within a bore hole is the limitation due to the available space on the film which may be carried in the apparatus. While, in accordance with the above, the film may be moved quite slowly, nevertheless in surveying a very deep well with the object of determining thin strata it is necessary that such a speed of movement be imparted to the film that a single film will be insufficient if the record which is made is only of the length of the film.

Apparatus for changing films or for selectively recording on different films are mechanically complicated. It is a further object of the present invention, therefore, to provide means whereby the total length of record which is made may be many times the actual length of film.

Figures 9, 10, 11, 12, 13, 14:
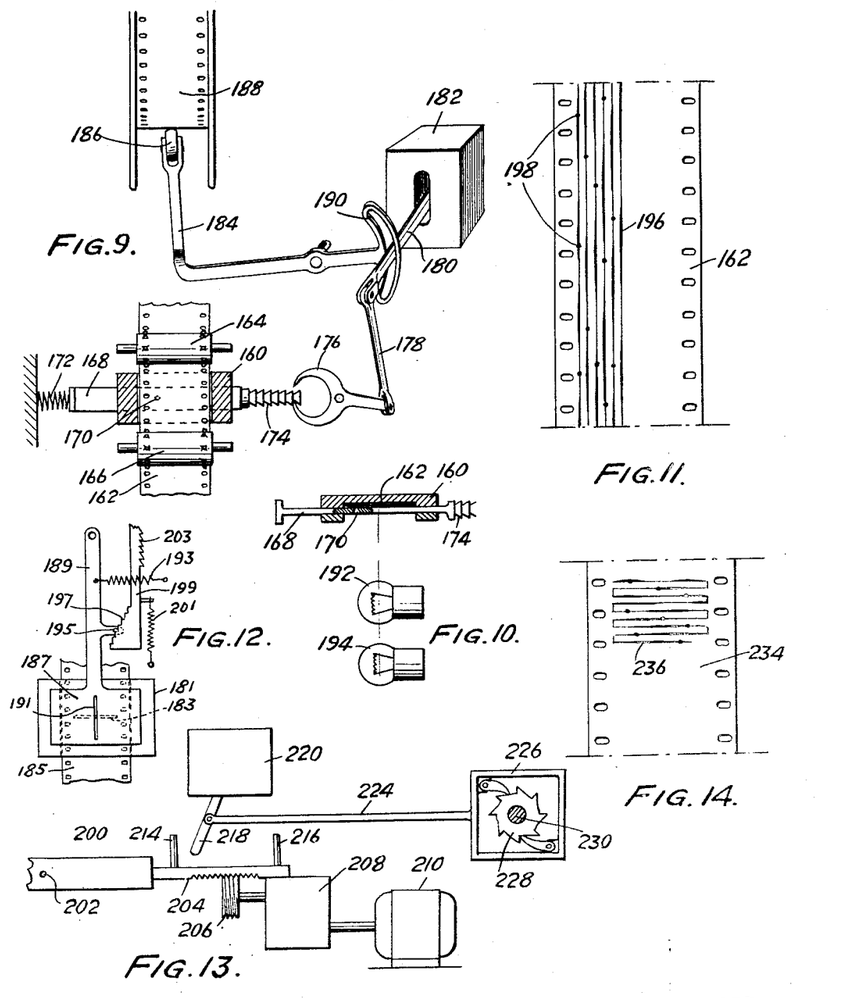
Fig. 9 is a diagrammatic view illustrating an arrangement whereby there may be produced on a film a record having many times the length of the film.
Fig. 10 is a diagrammatic sectional view showing the same apparatus.
Fig. 11 is a fragmentary view showing the type of record made upon a film by an apparatus of Figs. 9 and 10.
Fig. 12 is a diagrammatic view of a modified arrangement designed to produce a record similar to that produced by the mechanism of Fig. 9.
Fig. 13 is a further modification accomplishing the purpose of providing a very long record upon a limited length of film.
Fig. 14 is a fragmentary view of a record produced by the apparatus of Fig. 13.

In accordance with the modification illustrated in Figs. 9, 10 and 11, the type of recording indicated in Fig. 8 is used. In other words, a lamp is used to produce a record, the lamp being variably illuminated depending upon the high frequency currents flowing therethrough. Instead of providing a record of the full film width as in Fig. 8, however, quite narrow lines of varying density are produced upon the film.

A guide 160 is provided for the film 162, the film being moved by means of sprocket wheels 164 and 166, two of which are provided in order that the film may be properly moved in both directions, these sprockets being geared together. Additionally, there are connected to the sprocket driving means devices for rotating supply and take-up reels.

Below the film there is provided a transverse slide 168 which is provided with a minute opening 170 providing the only communication between the film and the space below the same. The slide 168 is urged toward the right by a spring 172 and is provided with an escapement arrangement indicated at 174 and 176 to control its movements towards the right. The member 176 of the escapement is connected by a link 178 to the operating lever 180 of a snap switch 182. A lever 174 carries a follower roller 186 which bears upon the film 188 on one of the reels, which act successively as supply and take-up reels. The end of this lever is provided with an arcuate slot 190.

A lamp 192 below the slide 168 corresponds with the lamp 152 of Fig. 8, namely, it is variably illuminated by current flowing in the oscillator circuit. An additional lamp 194 is provided, being arranged to flash brightly at suitable intervals by an accurate clockwork controlled switch.

In the operation of this device, the film 162 will be first moved continuously at a slow rate in one direction. As the movement takes place, a line of the film is continuously exposed to the illumination of the lamp 192 through the opening 170. Upon development, consequently, there will be found a line of variable density such as 196, the density depending upon the current flowing through the lamp. At intervals the lamp 194 is brightly illuminated for very short times and consequently there are produced spots 198 of very much increased density serving as time marks. If the roller 186 is assumed to be riding upon the reel acting at this time as a supply reel, it will ultimately cause a movement of the lever 180 of the snap switch 182 to such extent as to cause it to snap to its opposite position, this action occurring when the amount of film on the reel has dropped to some minimum. The snap switch is connected to reverse the motor which drives the sprockets 164 and 166 so that, as soon as the switch is actuated, the motor will reverse and movement of the film will take place in the opposite direction, the former supply reel now acting as the take-up reel and vice versa. At the same time, the escapement will act to permit the slide 168 to move slightly to the right of its former position. As a consequence, the record made as the film moves in the opposite direction will be displaced slightly laterally.

When the film again builds up on the reel with which the roller 186 cooperates, the switch will be again reversed and the escapement actuated so as to produce another record running in the opposite direction. It will be obvious that this action may be continued to produce a large number of records upon the film, the total record length being thus many times the length of the film.

Instead of reversing the film, it will be clear that the film may be made in the form of a continuous band, lateral displacement occurring at the proper time so as to produce a spiral record.

The film, such as that of Fig. 11, can be readily interpreted by the use of a photoelectric means responsive to the variations in a pencil of light directed through the records 196. The variations in the response of the photoelectric cell may be noted by an operator or may be caused to actuate an automatic potentiometer or the like giving, thereby, a record on a strip of paper. The dense spots indicated at 198 will, of course, produce corresponding responses in the photoelectric scanning device and hence times which are correlatable with depths may be ascertained. In a graphical record, for example, the time marks will consist of periodic sharp jumps in the record curve.

Inasmuch as there is generally relatively little lateral space available in a well surveying instrument, the mechanism illustrated in Fig. 12 may be used instead of that shown in Figs. 9 and 10. The mechanism of Fig. 12 will produce the same type of record as that illustrated in Fig. 11. In Fig. 12 a guiding member 181 is provided with a transverse slit 183 on the side between the lamps and the film 185. In order to provide an aperture, this slit 183 is intersected by a slit 191 formed in a mask 187 carried at the lower end of a lever 189 which may extend longitudinally of the instrument, the film moving past the slits in an axial direction. The lever 189 is urged toward the right by a spring 193 to bring a pin 195 carried thereby into engagement with one of the steps 197 formed on a slide 199, which is urged in a downward direction by a spring 201 and is held in various positions by escapement mechanism (not shown) cooperating with ratchet teeth 203 formed on the slide. The escapement mechanism may be of any suitable form equivalent to that indicated at 176 and connected with a reversing switch as in the case of the mechanism of Fig. 9. In the operation of the mechanism of Fig. 12, the aperture produced by the cross slits is effectively moved step by step at the time of each reversal of the continuously slowly moving film to produce the type of record indicated in Fig. 11.

The multiplication of the record length may also be accomplished in other fashions as, for example, that illustrated in Figs. 13 and 14. 200 represents a slide such as 168 provided with an opening 202. This slide is connected with a rod 204 provided with teeth meshing with a worm 206 driven through reduction gearing 208 by a motor 210. Projections 214 and 216 on 204 are arranged to engage the lever 218 of a switch 220 connected to reverse the motor 210. A link 224 connected to the switch lever 218 actuates a ratchet 228 through a pawl arrangement indicated at 226, the ratchet 228 driving a shaft 230 connected to a sprocket wheel arranged to advance a film 234.

In the operation of this modification, the film remains stationary while the opening 202 is caused to traverse the film to produce a record such as 236 which resembles the record 196 previously referred to, there being provided in this case also timing spots by intermittent flashing of a timing lamp. As the opening 202 approaches an edge of the film, the switch lever 218 will be engaged and will eventually snap sharply to its alternative position. The motor 210 will then be reversed and at the same time the film will be given a slight sharp advance so that the next traversal will occur in a displaced position. The record will consequently be of the type illustrated in Fig. 14. It will be observed that here again the record may be many times the length of film actually used. The record 236 would, of course, be scanned by a suitable photoelectric arrangement just as the one previously described.

The apparatus disclosed herein is particularly well adapted for operation in connection with a well surveying instrument of the multiple shot type. This is by reason of the fact that there is no necessity for running a cable to the surface. The exploratory unit may be coupled directly below a well surveying instrument of the type, for example, of that described in Williston and Nichols Patent No. 1,960,038, dated May 22, 1934.

In the operation of the instrument it will be obvious that accurate correlations of the readings of the pointer 52 with depth may be secured by noting at the surface by means of a watch synchronized with the clockwork mechanism 102 the times at which various depths are reached. Records correlating depth and time may also be made automatically.

In case it is desired to lower the exploratory apparatus on a drill stem, mechanism may be provided for interrupting the operation of the camera at predetermined times to avoid excessive waste of film during those periods when fourble lengths are being added to the drill stem. Mechanism for accomplishing this result may take the form of a time controlled switch which for periodic intervals may interrupt the illumination by the lamps 86 and 90 and also the feed of the film. Preferably the feed of the film takes place for a short period after the lights are extinguished in order that interruptions in the graph 126 will indicate when the lowering of the instrument was stopped. These form a further correlation of the record with depth.

It will be clear that numerous other variations may be made in the specific embodiment of the invention without departing from its scope.

What we claim and desire to protect by Letters Patent is:

1. Means for determining the location and character of formations penetrated by a bore hole comprising an exploring unit, said exploring unit including a crystal controlled generator of high frequency oscillations, means for establishing thereby an electromagnetic field penetrating formations in the vicinity of the bore hole, said last named means forming a part of a tuned portion of the generator circuit, and means responsive to variations in operation of the generator circuit due to changes of impedance of the field establishing means resulting from different materials in the vicinity thereof; and means for supporting said unit for movement within and lengthwise of the bore hole.

2. Means for determining the location and character of formations penetrated by a bore hole comprising an exploring unit, said exploring unit including a crystal controlled generator of high frequency oscillations, means for establishing thereby an electromagnetic field penetrating formations in the vicinity of the bore hole, said last named means forming a part of a tuned portion of the generator circuit, and means responsive to variations in operation of the generator circuit due to changes of impedance of the field establishing means resulting from different materials in the vicinity thereof; means for supporting said unit for movement within and lengthwise of the bore hole; and means for producing records of the responses of said responsive means.

3. Means for determining the location and character of formations penetrated by a bore hole comprising an exploring unit, said exploring unit including a crystal controlled generator of high frequency oscillations, means for establishing thereby an electromagnetic field penetrating formations in the vicinity of the bore hole, said last named means forming a part of a tuned portion of the generator circuit, means responsive to variations in operation of the generator circuit due to changes of impedance of the field establishing means resulting from different materials in the vicinity thereof, and means for producing records of the responses of said responsive means; and means for supporting said unit for movement within and lengthwise of the bore hole.

4. Means for determining the location and character of formations penetrated by a bore hole comprising an exploring unit, said exploring unit including a crystal controlled generator of high frequency oscillations, means for establishing thereby an electromagnetic field penetrating formations in the vicinity of the bore hole, said last named means forming a part of a tuned portion of the generator circuit, and means for automatically maintaining substantially constant an operating condition of the generator circuit despite changes of impedance of the field establishing means resulting from different materials in the vicinity thereof, which changes would normally modify said operating condition; and means for supporting said unit for movement within and lengthwise of the bore hole.

5. Means for determining the location and character of formations penetrated by a bore hole comprising an exploring unit, said exploring unit including a generator of high frequency oscillations, means for establishing thereby an electromagnetic field penetrating formations in the vicinity of the bore hole, said last named means forming a part of a tuned portion of the generator circuit, and means for automatically maintaining substantially constant an operating condition of the generator circuit despite changes of impedance of the field establishing means resulting from different materials in the vicinity thereof, which changes would normally modify said operating condition; and means for supporting said unit for movement within and lengthwise of the bore hole.

6. Means for determining the location and character of formations penetrated by a bore hole comprising an exploring unit, said exploring unit including a generator of high frequency oscillations, means for establishing thereby an electromagnetic field penetrating formations in the vicinity of the bore hole, said last named means forming a part of a tuned portion of the generator circuit, and means for automatically maintaining substantially constant an operating condition of the generator circuit despite changes of impedance of the field establishing means resulting from different materials in the vicinity thereof, which changes would normally modify said operating condition; means for supporting said unit for movement within and lengthwise of the bore hole; and means for producing records of the operation of said means for maintaining said operating condition substantially constant.

7. Means for determining the location and character of formations penetrated by a bore hole comprising an exploring unit, said exploring unit including a generator of high frequency oscillations, means for establishing thereby an electromagnetic field penetrating formations in the vicinity of the bore hole, said last named means forming a part of a tuned portion of the generator circuit, means for automatically maintaining susbtantially constant an operating condition of the generator circuit despite changes of impedance of the field establishing means resulting from different materials in the vicinity thereof, which changes would normally modify said operating condition, and means for producing records of the operation of said means for maintaining said operating condition substantially constant; and means for supporting said unit for movement within and lengthwise of the bore hole.

8. Means for determining the location and character of formations penetrated by a bore hole comprising an exploring unit, said exploring unit including a generator of high frequency oscillations, means for establishing thereby an electromagnetic field penetrating formations in the vicinity of the bore hole, said last named means forming a part of a tuned portion of the generator circuit, and means for automatically maintaining substantially constant an operating condition of the generator circuit despite changes of impedance of the field establishing means resulting from different materials in the vicinity thereof, which changes would normally modify said operating conditions, said last named means comprising a variable impedance in said tuned portion of the generator circuit and a motor for reversibly changing said variable impedance; and means for supporting said unit for movement within and lengthwise of the bore hole.

9. Means for determining the location and character of formations penetrated by a bore hole comprising an exploring unit, said exploring unit including a generator of high frequency oscillations, means for establishing thereby an electro-magnetic field penetrating formations in the vicinity of the bore hole, a lamp the luminosity of which is responsive to varying effects upon said field of materials in the vicinity of the field establishing means, and means for producing records of the variations in luminosity of said lamp.

10. Means for determining the location and character of formations penetrated by a bore hole comprising an exploring unit, said exploring unit including a generator of high frequency oscillations, means for establishing thereby an electro-magnetic field penetrating formations in the vicinity of the bore hole, a lamp the luminosity of which is responsive to varying effects upon said field of materials in the vicinity of the field establishing means, and means for producing on a sensitized strip records of the variations in luminosity of said lamp, said records being of linear form and substantially longer than said strip.

11. The method of determining the location and character of formations penetrated by a bore hole comprising generating high frequency oscillations within the bore hole by means of a generator, establishing thereby a substantially localized electromagnetic field penetrating strata in the vicinity of the bore hole, moving said localized field lengthwise of the bore hole, maintaining susbtantially constant an operating condition of the generator circuit despite tendencies for variations thereof resulting from different materials in said field, and recording the operations necessary to maintain said operating condition susbtantially constant.

12. The method of determining the location and character of formations penetrated by a bore hole comprising generating high frequency oscillations within the bore hole by means of a crystal controlled generator, establishing thereby a substantially localized electromagnetic field pene-taining substantially constant an operating con-moving said localized field lengthwise of the bore hole, maintaining substantially constant an operating condition of the generator circuit despite tendencies for variation thereof resulting from different materials in said field, and recording the operations necessary to maintain said operating condition substantially constant.

13. Means for determining the location and character of formations penetrated by a bore hole comprising an exploring unit, said exploring unit including a vacuum tube generator of high frequency oscillations and means for establishing thereby an electromagnetic field penetrating formations in the vicinity of the bore hole, the grid current of said generator being affected by materials in the vicinity of the field establishing means; and means for producing indications of said grid current.

14. Means for determining the location and character of formations penetrated by a bore hole comprising an exploring unit, said exploring unit including a crystal controlled generator of high frequency oscillations, means for establishing thereby an electromagnetic field penetrating formations in the vicinity of the bore hole, a lamp the luminosity of which is responsive to varying effects upon said field of materials in the vicinity of the field establishing means, and means for producing records of the variations in luminosity of said lamp.

CHARLES B. BAZZONI.
JOSEPH RAZEK.

---

CERTIFICATE OF CORRECTION.

Patent No. 2,167,630.     August 1, 1939.

CHARLES B. BAZZONI, ET AL.

It is hereby certified that error appears in the printed specification of the above numbered patent requiring correction as follows: Page 5, second column, line 34, for the reference numeral "174" read 184; page 8, first column, lines 16 and 17, strike out "pene-taining substantially constant an operating con-" and insert instead the words and comma penetrating strata in the vicinity of the bore hole; and that the said Letters Patent should be read with this correction therein that the same may conform to the record of the case in the Patent Office.

Signed and sealed this 12th day of September, A. D. 1939.

Henry Van Arsdale,
(Seal)     Acting Commissioner of Patents.

---

CERTIFICATE OF CORRECTION.

Patent No. 2,167,630.     August 1, 1939.

CHARLES B. BAZZONI, ET AL.

It is hereby certified that in Certificate of Correction issued September 12, 1939 in the above numbered patent, in lines 8 and 9, the insertion "penetrating strata in the vicinity of the bore hole" should read penetrating strata in the vicinity of the bore hole,; so that the said Certificate may conform to the record of the case in the Patent Office.

Signed and sealed this 3rd day of October, A. D. 1939.

Henry Van Arsdale,
(Seal)     Acting Commissioner of Patents.